Oct. 8, 1929.                    O. M. JUDD                    1,730,733
                              TIRE PROTECTOR
                           Filed Dec. 1, 1926
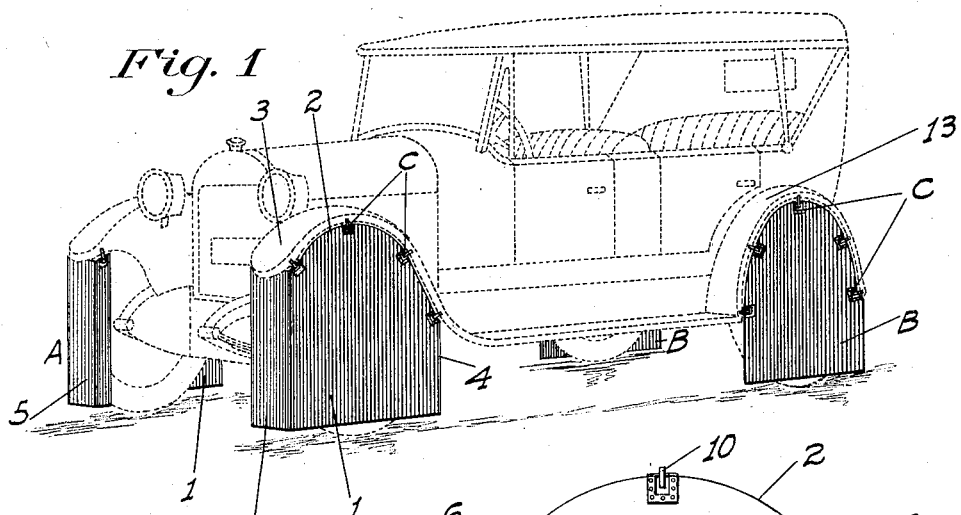
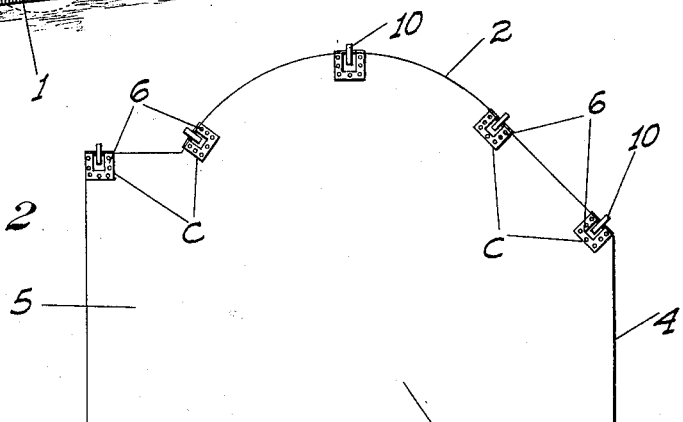
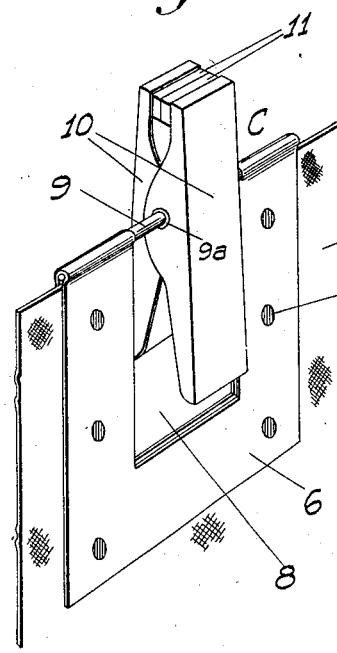
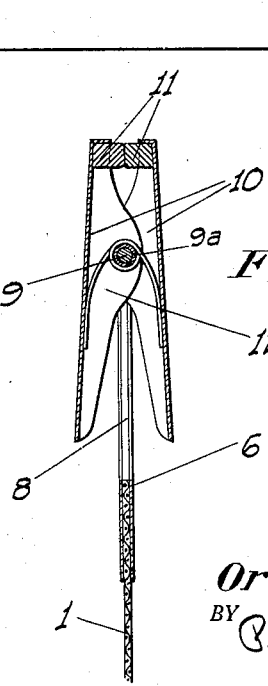
INVENTOR.
Orion M. Judd
BY
    ATTORNEY Patented Oct. 8, 1929

1,730,733

UNITED STATES PATENT OFFICE

ORION M. JUDD, OF FRESNO, CALIFORNIA

TIRE PROTECTOR

Application filed December 1, 1926. Serial No. 152,015.

This invention relates to protectors for pneumatic tires when the latter are mounted on the wheels of a motor vehicle, my principal object being to provide a structure for the purpose arranged to be detachably mounted in position on the vehicle, and which will then properly shield and protect the tires when standing from deteriorating influence of the direct rays of the sun. The device is therefore particularly valuable to campers and all those who in the ordinary usage of their cars have to leave them standing for considerable periods exposed to the sun.

A further object of the invention is to provide protectors for the purpose arranged to be quickly and easily applied or detached and which when not in use may be folded up into a very compact space so that they may be easily stored in any convenient compartment in the vehicle.

Another object of the invention is to provide clips on the protectors for enabling the same to be attached to the fenders of the vehicle, so mounted as to enable such attachment to be made to either a vertical or a horizontal fender-edge with equal facility; and so that the same protector can be used on either side of the vehicle indiscriminately.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Fig. 1 is a perspective outline of a motor vehicle showing my tire protectors installed thereon.

Fig. 2 is a side elevation of a front wheel protector outstretched and detached.

Fig. 3 is a fragmentary perspective elevation of a curtain and a clip mounted thereon.

Fig. 4 is a vertical section of a clip.

Referring now more particularly to the characters of reference on the drawings, the protector arrangement comprises a pair of protectors A for the front wheels, and another separate pair B for the rear wheels. The front wheel protectors are duplicates of each other and each comprises a curtain 1 of suitable flexible material such as burlap, canvas or the like.

The main body of the curtain is straight along its lower edge so as to lie parallel to and a short distance clear of the ground, while its upper edge is cut on a curve at 2 conforming to that of the front wheel fender 3 of the vehicle. Said main body is adapted to extend rearwardly from the front edge of the fender to a point such that the rear vertical edge 4 of the curtain will lie rearwardly of the rear edge of the corresponding front wheel tire.

At its front end the body 1 is formed with an extension or wing 5 adapted, when the curtain is being positioned, to be folded over so as to extend transversely of the fender for the full width thereof at its front end as shown in Fig. 1. This wing will then, as will be evident, enclose the front of the tire from the sun's rays beating down on the same from the front of the vehicle.

To support the curtain from the fender, so that it will be held in suspended relation to the ground, I mount a number of clip devices C at spaced intervals along the upper edge of the curtain. Each clip device comprises a metal plate 6 built double to straddle the curtain and being secured thereto by rivets 7 or the like. Each plate and the curtain material is cut away from the top downwardly and intermediate the ends to form a relatively large slot or opening 8. Secured to the plate at the top thereof and extending across the opening is a rod 9, which serves as a pivot and support for a sleeve $9^a$ on which a pair of opposed clamping jaw and handle members 10 are mounted in a suitable manner. The outer ends of the jaws are adapted to be spread by contraction of the opposite ends so that such outer ends will straddle the edge of a fender and preferably have opposed pads 11 of rubber or the like, so as to frictionally engage the fender without damaging the enamel. The jaws are normally held closed, so that the pads will engage each other or the fender, by a spring 12 mounted on the sleeve 9ª between the jaw members and engaging the handle portions of the same. The lower portions of the members 10, which serve as handles for enabling the jaws to be spread, normally project into the space 8 so as to enable the operator to manipulate the handles, and also to enable the jaw members to swing one way or the other relative to the curtain without interference. This freely swinging feature of the clips enables the latter to be disposed in line with the part of the fender to be engaged, regardless of whether said part is vertically, horizontally or angularly disposed; while enabling the curtain to maintain a vertical position at all times without being warped or distorted.

As many of said clip devices may be applied to a curtain as may be desired. In any event, however, there is one at each end of the main body of the curtain, one at the outer end of the wing 5, and one centrally of the length of the main body member. It will therefore be seen that when the protectors are in place, the tires will be protected from the sun's rays, while at the same time the protectors do not contact with the tires or the ground and therefore do not tend to become readily soiled.

This arrangement of the clips also permits either curtain to be used either on the right or left hand side of the car (since the curtain itself is flexible throughout and the wing 5 may be bent one way or the other), thus avoiding the necessity of having one certain curtain which can be fitted to protect only one wheel.

For the rear wheels the curtains B extend from the front to the rear of the rear fenders 13, the upper edges of said curtains being cut to follow the curvature of the fenders. Since the rear fenders usually project downwardly a considerable distance at the back, a cross extension piece corresponding to the wing 5 of the front protectors is deemed unnecessary. These rear wheel curtains also have a suitable number of the clip devices C arranged in the same manner as those on the front curtains and for the same purpose.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A tire protector comprising a flexible curtain whose area is sufficient to shield the outer surface of the tire, and clips mounted along the upper edge of the curtain at spaced intervals for detachable engagement with a fender.

2. A tire protector comprising a flexible curtain to depend downwardly on the outside of the tire, clips disposed along the upper edge of the curtain at spaced intervals for detachable engagement with a fender, and means mounting the clips in place on the curtain to enable them to freely swing in a transverse plane at right angles to said edge of the curtain whereby to enable said clips to be manipulated from either side of the curtain.

3. A tire protector for a motor vehicle comprising a curtain to depend downwardly on the outside of a tire; the upper edge of the curtain being cut out at longitudinally spaced intervals, clips to swing in said cut out areas arranged to engage a fender of the vehicle, and means between the clips and curtain for supporting the clips in place.

In testimony whereof I affix my signature.
ORION M. JUDD.